Patented Mar. 6, 1928.

1,661,250

UNITED STATES PATENT OFFICE.

FREDERICK L. DUNLAP, OF CHICAGO, ILLINOIS, ASSIGNOR TO INDUSTRIAL APPLIANCE COMPANY, OF CHICAGO, ILLINOIS, A CORPORATION OF ILLINOIS.

FLOUR-TREATING PROCESS.

No Drawing.  Application filed November 16, 1923.  Serial No. 675,039.

My invention relates to the production of wheat flour bakery goods or oven products, such as crackers, cookies, and the like, in which crispness or brittleness is desirable; and the object of the invention is to provide a novel method of treating the flour or the dough to bring about this desired brittleness or crispness or "short" effect without the use of the customary animal or vegetable fat or shortening, or with at least the use of a decreased amount of such shortening.

The novel method consists in imparting to the flour during the milling operation, or later, before or after incorporation of the flour in the dough, a degree of alkalinity which will produce certain physico-chemical changes in the gluten of the flour whereby the desired "short" effect is obtained in the oven product.

Natural wheat flour is ordinarily, to a certain extent, acid in its character and it has been known for some time that the control of the intensity of acidity (hydrogen ion concentration) of a yeast leavened bread dough is an important factor in producing bread with characteristics that are considered desirable, and that the best results are obtained when the dough has an intensity of acidity of $pH=5$, which optimum will, however, vary somewhat according to the character of the flour. Consequently as flours more or less freshly milled usually have a lower degree of acid intensity it has been the practice of bread makers to add acids in preparing bread doughs in amounts necessary to give them a desired initial intensity of acidity before the dough is fermented.

The conditions attending the baking of crackers, cookies or other unleavened oven products in which crispness, or brittleness is required, are quite different from those controlling the making of a leavened bread, and I have discovered that if the flour or dough is treated with suitable alkalis (suitable in the sense of being a harmless ingredient of the food product, for any alkali will serve the purpose) so that the dough instead of being acid, as in bread making, will have a degree of alkalinity within a certain limited range that can be fixed with approximate definiteness, a "short" or brittle oven product of the cracker type may be produced without the use of the usual shortening or at least with less shortening than is customarily used for obtaining the desired result. This treatment of the flour or dough has the advantages, in comparison with the use of shortening, of making the product less subject to rancidity because of the lessened amount of shortening and reducing the cost of manufacture.

It has been customary, in the bread baking industry, to test flours and doughs to determine their acidity, or hydrogen ion concentration, and inasmuch as the product of the concentration of the hydrogen and hydroxyl ions is always a constant, the same scale as is used for determining acidity may be extended beyond the neutral point and employed for measuring alkalinity of the substance, in which case it is convenient and usual to measure alkalinity in terms of the acidity units. On the usual pH scale the neutral point is 7 and the acidity portion of the scale is below 7, the alkalinity portion being above 7, alkalinity being measured in terms of hydrogen ion concentration (pH). As a matter of convenience this method will be hereinafter employed.

In accordance with my present invention the flour or the dough is treated so that, having regard to all of the ingredients of the dough and their reactions, the dough will have an alkalinity within the range represented by $pH=9$ to $pH=12$. When the alkalinity has been increased (increase in pH meaning a decrease in hydrogen ion concentration and an increase in hydroxyl ion concentration) to a pH of about 9, the viscosity or hydration capacity of the gluten of the flour begins to increase and this results in a change in physical properties in giving the oven product made from the flour the brittleness or "short" effect desired. This effect increases in a very marked degree as the alkalinity is augmented from approximately $pH=9$ to $pH=11$, the optimum, whereupon the further addition of alkali brings about a reduction in the effect until a pH of about 12 is reached. Obviously the amount of alkali may be based either on the rising or falling side of the curve (the former being preferable as involving less of the treating agent which, if used in excess, may affect the taste of the goods) and as between the limits so imposed the precise amount of the treating agent will depend upon the degree of shortening effect desired in the product.

It will be obvious from the foregoing that it is not possible to give any specific prescription as to the amounts of the treating agents to be used since that will depend upon a number of variable factors: (1) The natural hydrogen ion concentration of the flour. A patent flour, for example, will have a higher intensity of acidity than a straight flour. (2) The age of the flour which affects its acidity. (3) Possible prior treatment to produce artificial aging or maturing by increasing the acidity of the flour through treatment with certain gases. (4) The character and ingredients of the dough which may affect the pH to a greater or less degree. (5) The particular effect desired in the finished producet. (6) Buffer action in the flour with respect to which different types and grades of flour differ considerably one from the other. (7) The character of the alkali used. All alkalis act in the same general way their different action being one of degree rather than kind.

However, it is possible by known methods to ascertain the pH values of flours and doughs for example electrometrically by means of instruments which have been used extensively in the bread making art and elsewhere so that by testing a particular flour or dough, after treatment it can be readily learned whether the desired pH has been obtained or whether it is necessary to modify the initial treatment.

An alkali or alkaline reacting salt must, of course, be chosen which is harmless and, when used within the defined limits, imports no unpleasant or undesirable taste into the product. It is possible to use caustic soda (NaOH). A more convenient and suitable reagent is sodium bicarbonate ($NaHCO_3$). The flour may be treated by showering the flour and spraying it in suspension with a solution of the alkali or alkaline salt. The alkali may be introduced in suitable proportions into the dough batch. Treatment of the dough is obviously treatment of the flour. The stage at which treatment takes place is merely a matter of convenience.

My invention is not to be considered as limited to any particular method of giving the flour or dough the degree of alkalinity necessary to produce the desired effect. The term alkali as used in the claims is intended to cover all suitable substances which in aqueous solution have an alkaline reaction, that is, those which have a pH substantially greater than 7.

I claim:

1. Method of producing a shortening effect in wheat flour oven products, which consists in treating the flour to give it an alkalinity substantially within the range represented by pH=9 to pH=12.

2. Method of producing a shortening effect in wheat flour oven products which consists in treating the flour to give it an alkalinity of substantially pH=11.

3. Wheat flour having an alkalinity substantially within the range represented by pH=9 to pH=12.

4. Wheat flour having an alkalinity of substantially pH=11.

FREDERICK L. DUNLAP.